(No Model.)  2 Sheets—Sheet 1.

C. C. STUART.
BELT TIGHTENER.

No. 520,580.  Patented May 29, 1894.

Witnesses
C. E. Lundgren
George Barry.

Inventor:
Charles C. Stuart
by attorneys
Brown & Seward (No Model.) 2 Sheets—Sheet 2.
C. C. STUART.
BELT TIGHTENER.
No. 520,580. Patented May 29, 1894.
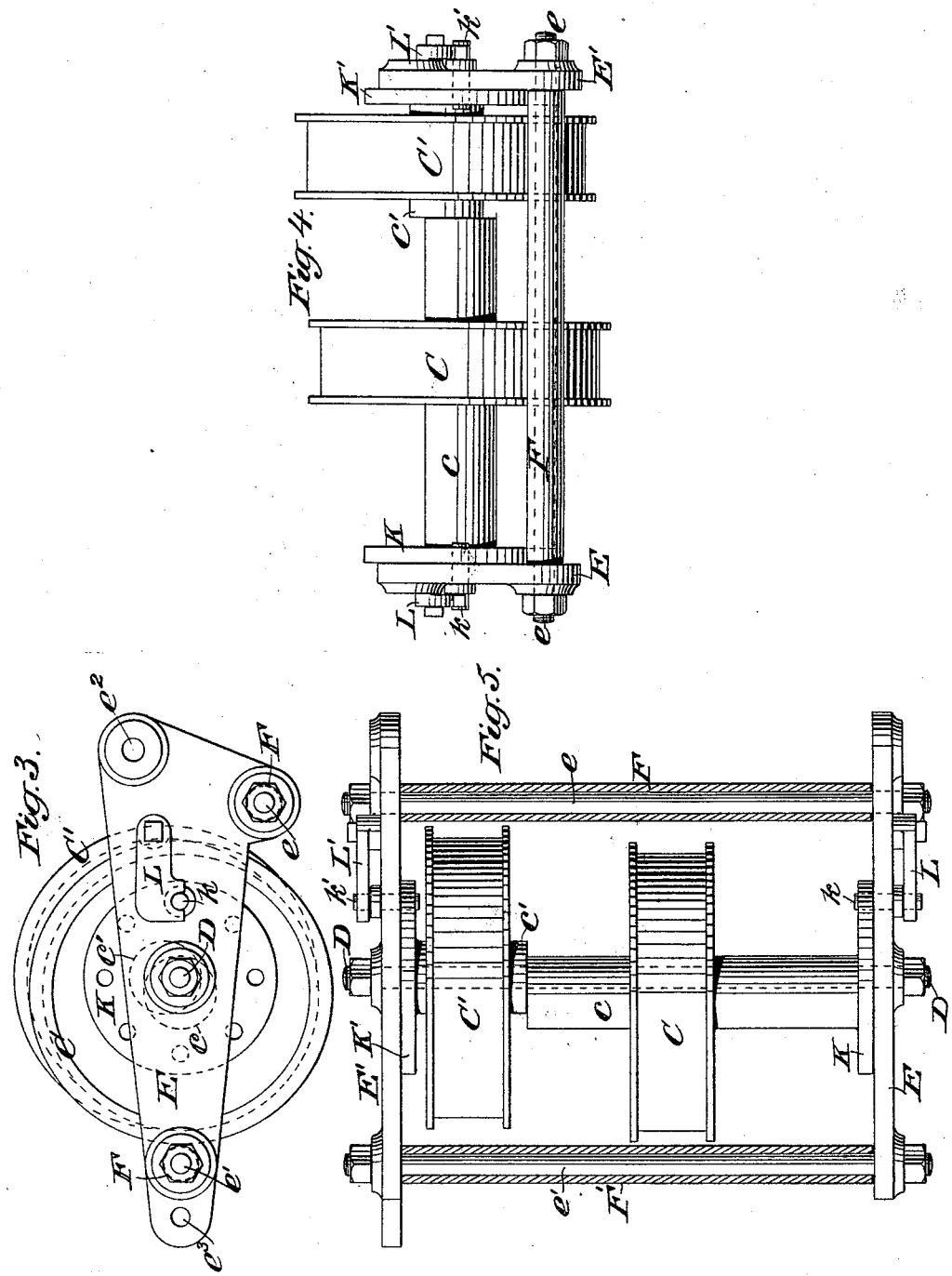

UNITED STATES PATENT OFFICE.

CHARLES C. STUART, OF BROOKLYN, NEW YORK, ASSIGNOR TO THE GLEN COVE MACHINE COMPANY, OF SAME PLACE.

BELT-TIGHTENER.

SPECIFICATION forming part of Letters Patent No. 520,580, dated May 29, 1894.

Application filed November 14, 1893. Serial No. 490,889. (No model.)

*To all whom it may concern:*

Be it known that I, CHARLES C. STUART, of Brooklyn, in the county of Kings and State of New York, have invented a new and useful Improvement in Belt-Tighteners, of which the following is a specification.

My invention relates to an improvement in belt tighteners and more particularly to belt tighteners adapted to use in connection with cross belts where they are liable to be placed under varying tension and to become unshipped when subjected to any considerable degree of change in direction.

I have chosen to illustrate my invention the cross belts for driving the side cutter heads of a planing machine.

Figure 1:
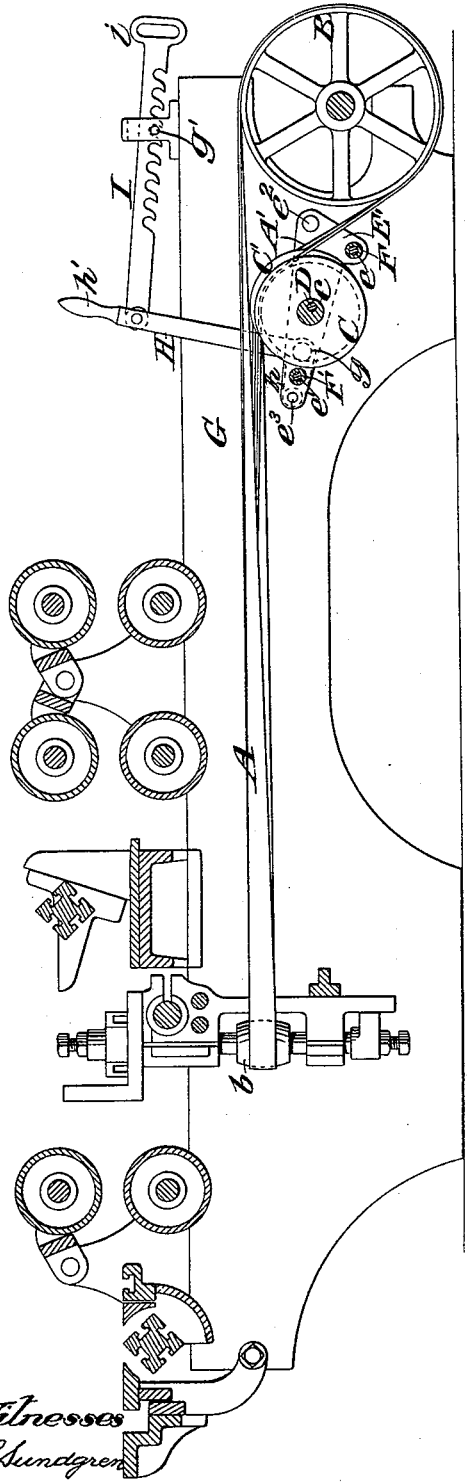
Figure 2:
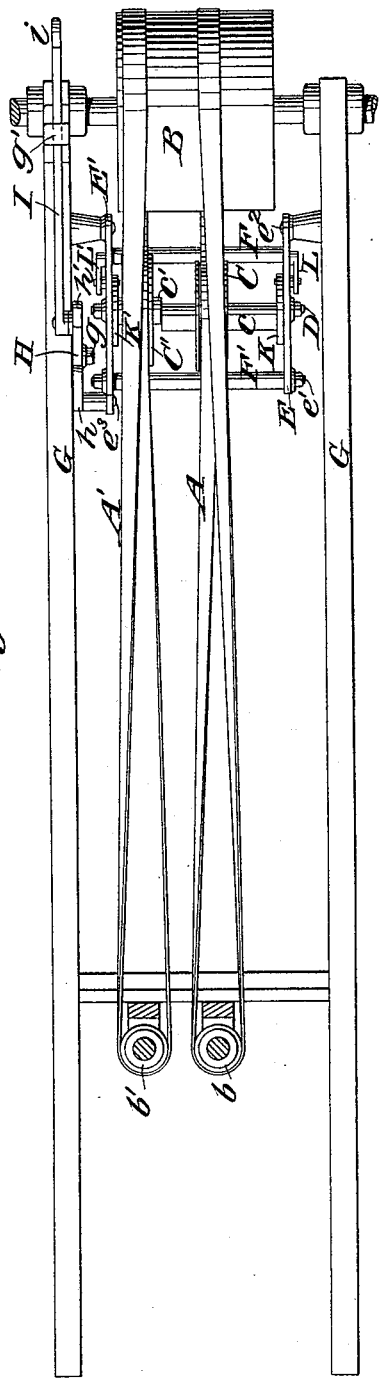

In the accompanying drawings, Figure 1 is a view of the principal parts of a planing machine in vertical longitudinal section, showing the belts for driving the side cutters and the belt tighteners in side elevation. Fig. 2 is a top plan view of the belts and the tightening mechanism, the upper parts of the machine being removed. Fig. 3 is an enlarged view in detail of the tightening pulleys and their support in side elevation. Fig. 4 is a view of the same in front elevation, and Fig. 5 is a top plan view of the same partly in section.

My invention contemplates a swinging frame carrying a loose pulley for each side head belt, each pulley revolving on a bushing which is bored eccentric to the center of its supporting spindle or shaft. Each eccentric bushing is provided with a perforated disk by which any degree of eccentricity to which the bushing may be set is maintained, thereby providing for a different degree of tension for the two side belts, or the equalization of a normally different tension, and the common tension of the belts may be increased or diminished as well by the use of a single lever for rocking the swinging frame. The said belts are denoted respectively by A and A' and are shown as extending from a driving drum or pulley B to the side head spindles $b$ and $b'$. The loose pulleys for engaging one part of each belt for tightening the belts and directing them properly to the side head pulleys are denoted by C and C'. They are mounted upon bushings $c$, $c'$ which bushings are eccentrically mounted independently of each other upon a spindle D extending between the opposite sides E and E' of a swinging frame. The sides E, E' of the swinging frame are connected by cross bars which, in the present instance, consist of rods or bolts $e$, $e'$ extending longitudinally through hollow spacing tubes F, F', located between the sides and through the sides themselves, their ends being provided with nuts for drawing the sides snugly into contact with the opposite ends of the spacing tubes. The swinging frame is pivoted to the bed frame G at or near one end, as at $e^2$, and is swung up and down upon its pivotal connection by means of an angle lever pivoted to the main frame, as at $g$, and having its short arm $h$ loosely connected, as at $e^3$, with the free end of the swinging frame while its long arm H extends upwardly and terminates in a handle $h'$. A toothed bar I, provided with a handle $i$, is loosely secured to the handle H of the angle lever and leads over a stop $g'$ attached to the bed frame so that the lever H may be pulled over or lifted forward at pleasure and retained in its desired swung adjustment by the engagement of the teeth on the bar I with the stop $g'$, as clearly indicated in Fig. 1.

The bushings $c$ and $c'$ are each provided with a perforated disk fixed thereto, the disk fixed to the bushing $c$ being denoted by K and the disk fixed to the bushing $c'$ being denoted by K'. These disks may be conveniently located in proximity to the inner faces of the sides E and E' of the swinging frame so as to receive adjusting pins $k$ and $k'$ seated in perforations in the sides E, E', into the one or the other of the perforations in the disks to hold the disks in the desired rotary adjustment. Dogs L and L' pivoted to the outer faces of the sides E and E' may be dropped into position, as shown in Figs. 3 and 5, to hold the pins $k$ and $k'$ in position after the disks have been adjusted.

By rocking the bushings $c$ and $c'$ on their common support so as to bring the tightening pulleys C and C' more or less toward the belts, the belts may be given a different degree of tension and this is oftentimes found to be important, as one of the side cutters is often required to do heavy work while, at the same time, the opposite side cutter is required to do comparatively light work. After the pulleys have been set in their proper relation to the belts to give the two belts the desired relative degree of tightness, the two belts may be simultaneously tightened or loosened by the operation of the lever for rocking the frame in which the pulleys are mounted bodily toward or away from the belts.

What I claim is—

1. The combination with a pair of belts, of belt tightening pulleys eccentrically mounted upon a common shaft to be moved simultaneously toward and away from the belt and means for setting the pulleys independently of each other toward and away from their respective belts, substantially as set forth.

2. The combination with a pair of belts, of a swinging frame, means for swinging the frame, belt tightening pulleys, independent bushings eccentrically mounted upon a common spindle or shaft in the swinging frame and belt tightening pulleys one for each belt, one of the pulleys being loosely mounted upon one of the bushings and another upon another of the bushings, substantially as set forth.

3. The combination with a pair of belts, a swinging frame, a lever for rocking the frame and means for holding the lever in its various adjustments, of bushings eccentrically mounted upon a common support, locking devices for holding the eccentrically mounted bushings in different rocking adjustments, and belt tightening pulleys mounted upon the bushings, substantially as set forth.

CHARLES C. STUART.

Witnesses:
FREDK. HAYNES,
F. HOWARD TITLAR.